United States Patent
Wigger et al.

(10) Patent No.: US 8,096,578 B2
(45) Date of Patent: Jan. 17, 2012

(54) KNEE AIRBAG

(75) Inventors: Henning Wigger, Detroit, MI (US);
Gerardo Mendez, Rochester, MI (US)

(73) Assignee: TK Holdings Inc., Auburn Hills, MI (US)

( * ) Notice: Subject to any disclaimer, the term of this patent is extended or adjusted under 35 U.S.C. 154(b) by 329 days.

(21) Appl. No.: 12/289,710

(22) Filed: Oct. 31, 2008

(65) Prior Publication Data

US 2009/0134611 A1    May 28, 2009

Related U.S. Application Data

(60) Provisional application No. 60/996,148, filed on Nov. 2, 2007.

(51) Int. Cl.
*B60R 21/205* (2006.01)
*B60R 21/20* (2006.01)
*B60R 21/23* (2006.01)

(52) U.S. Cl. .......... 280/732; 280/730.1; 280/743.2; 280/728.2

(58) Field of Classification Search .......... 280/730.1, 280/732, 743.1, 743.2, 728.2
See application file for complete search history.

(56) References Cited

U.S. PATENT DOCUMENTS

| | | | | |
|---|---|---|---|---|
| 5,362,101 A * | 11/1994 | Sugiura et al. | .......... | 280/743.2 |
| 5,536,043 A * | 7/1996 | Lang et al. | .......... | 280/753 |
| 6,431,583 B1 * | 8/2002 | Schneider | .......... | 280/728.2 |
| 6,886,858 B2 * | 5/2005 | Olson | .......... | 280/743.2 |
| 7,314,230 B2 * | 1/2008 | Kumagai et al. | .......... | 280/730.1 |
| 7,393,011 B2 * | 7/2008 | Keshavaraj | .......... | 280/743.2 |
| 7,452,002 B2 * | 11/2008 | Baumbach et al. | .......... | 280/743.2 |
| 7,748,730 B2 * | 7/2010 | Kashiwagi | .......... | 280/728.2 |
| 7,766,374 B2 * | 8/2010 | Abele et al. | .......... | 280/730.1 |
| 2005/0052009 A1 * | 3/2005 | Abe | .......... | 280/743.1 |
| 2005/0134024 A1 * | 6/2005 | Kumagai et al. | .......... | 280/730.1 |
| 2005/0151351 A1 * | 7/2005 | Enders et al. | .......... | 280/730.1 |
| 2005/0189741 A1 * | 9/2005 | Abe et al. | .......... | 280/730.1 |
| 2005/0230939 A1 * | 10/2005 | Abe et al. | .......... | 280/728.2 |
| 2006/0108780 A1 * | 5/2006 | Hotta et al. | .......... | 280/732 |
| 2007/0090632 A1 * | 4/2007 | Kashiwagi | .......... | 280/730.1 |
| 2007/0126212 A1 * | 6/2007 | Takimoto et al. | .......... | 280/730.1 |
| 2007/0222189 A1 * | 9/2007 | Baumbach et al. | .......... | 280/730.1 |
| 2007/0267852 A1 * | 11/2007 | Enders | .......... | 280/730.1 |
| 2008/0116669 A1 * | 5/2008 | Adachi et al. | .......... | 280/730.1 |

* cited by examiner

*Primary Examiner* — Eric Culbreth
*Assistant Examiner* — George D. Spisich
(74) *Attorney, Agent, or Firm* — Foley & Lardner LLP

(57) ABSTRACT

A knee airbag apparatus includes a front panel configured to face toward an occupant when the knee airbag deploys and a rear panel configured to face toward an instrument panel when the knee airbag deploys. The rear panel is joined to the front panel to form an inflatable knee cushion configured to inflate to protect an occupant's knees during a crash event. The knee airbag further includes at least one internal tether extending between the front and rear panels. The internal tether is attached to the front panel at a front panel attachment location offset from a rear panel attachment location. The knee airbag further includes an external tether attached at one end to the front panel, and at a second end at the knee airbag housing.

17 Claims, 6 Drawing Sheets

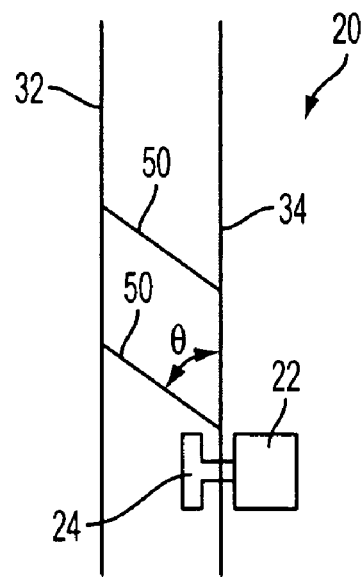
FIG. 7A
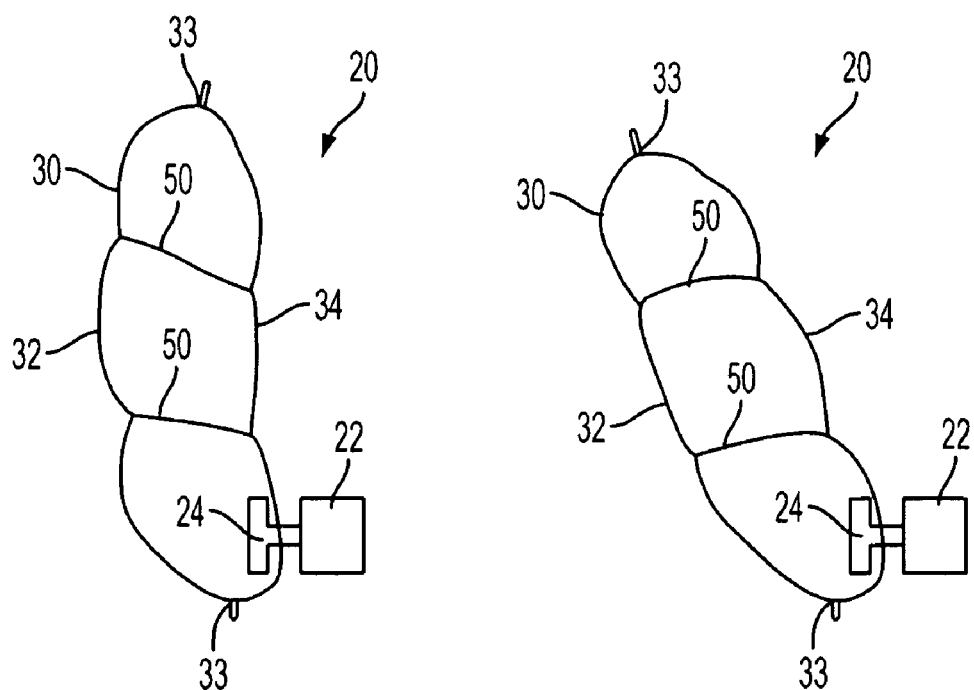
FIG. 7B
FIG. 7C
(PRIOR ART)

KNEE AIRBAG

CROSS-REFERENCE TO RELATED PATENT APPLICATIONS

This application claims priority from Provisional Application U.S. Application 60/996,148, filed Nov. 2, 2007, incorporated herein by reference in its entirety.

BACKGROUND

The present disclosure relates generally to the field of vehicle airbags. More particularly, the present disclosure relates to the field of knee airbags with improved deployment.

Airbags are provided in vehicles to protect occupants from injury in the event of a vehicle crash. Knee airbags in particular can help prevent injury to an occupant's legs by preventing the legs from hitting the dash or an instrument panel in the event of a crash.

SUMMARY

One exemplary embodiment provides a knee airbag apparatus. The knee airbag apparatus comprises a front panel configured to face toward an occupant when the knee airbag deploys, and a rear panel configured to face toward an instrument panel when the knee airbag deploys. The rear panel is joined to the front panel to form an inflatable knee cushion configured to inflate to protect an occupant's knees during a crash event. The knee airbag apparatus includes a first internal tether extending between the front and rear panels. The first internal tether is attached to the front panel at a front panel attachment location offset from a rear panel attachment location.

Another exemplary embodiment provides method of forming a knee airbag. The method comprises: joining a front panel to a rear panel to form a knee cushion; laying the knee cushion flat such that the rear panel is on top of the front panel; and folding the knee cushion. Folding of the knee cushion includes rolling the knee cushion beginning at a top end of the knee cushion toward a bottom end of the knee cushion with a mounting bracket. After rolling the knee cushion toward the bottom end, the knee cushion is folded back towards the front end in a Z-type fold.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below.

FIG. 7A is a side view of a partially assembled knee airbag cushion illustrating internal tethers according to an exemplary embodiment.

FIG. 7B is a side view of a knee airbag cushion including a plurality of offset internal tethers according to an exemplary embodiment.

FIG. 7C is a side view of a known knee airbag cushion including a plurality of parallel tethers according to prior art.

DETAILED DESCRIPTION OF THE PREFERRED EMBODIMENTS

Airbags may be provided in a vehicle to protect the occupants of the vehicle in a collision. The airbags generally comprise a fabric bag or cushion that is inflated with gas from a gas generator (e.g., a pyrotechnic gas generator). The airbags are often stored out of sight, such as behind trim pieces, and are inflated to occupy the space between an occupant of the vehicle and a structure that may injure the occupant in a collision (e.g., a steering wheel, the vehicle dash, instrument panel, doors, windows, etc.)

Knee airbags are provided in vehicles to help prevent an occupant's legs from hitting a dash or instrument panel in the event of a vehicle collision. However, the force of a still-inflating airbag may injure the occupant, especially in an out-of-position (OOP) situation, such as if the occupant is not wearing a safety belt and is too close to the dash when the airbag deploys. In order to decrease possible injury to an occupant's legs occurring from the force of the deploying airbag, it is desirable to minimize the interaction between a deploying airbag cushion and occupants' legs. In an embodiment, the trajectory of the airbag is in a generally vertical direction. With the vertical trajectory, the airbag deploys upward, following the instrument panel surface, rather than toward the occupant's legs, thus decreasing the interaction between the deploying airbag cushion and the occupant's legs.

Figure 1:
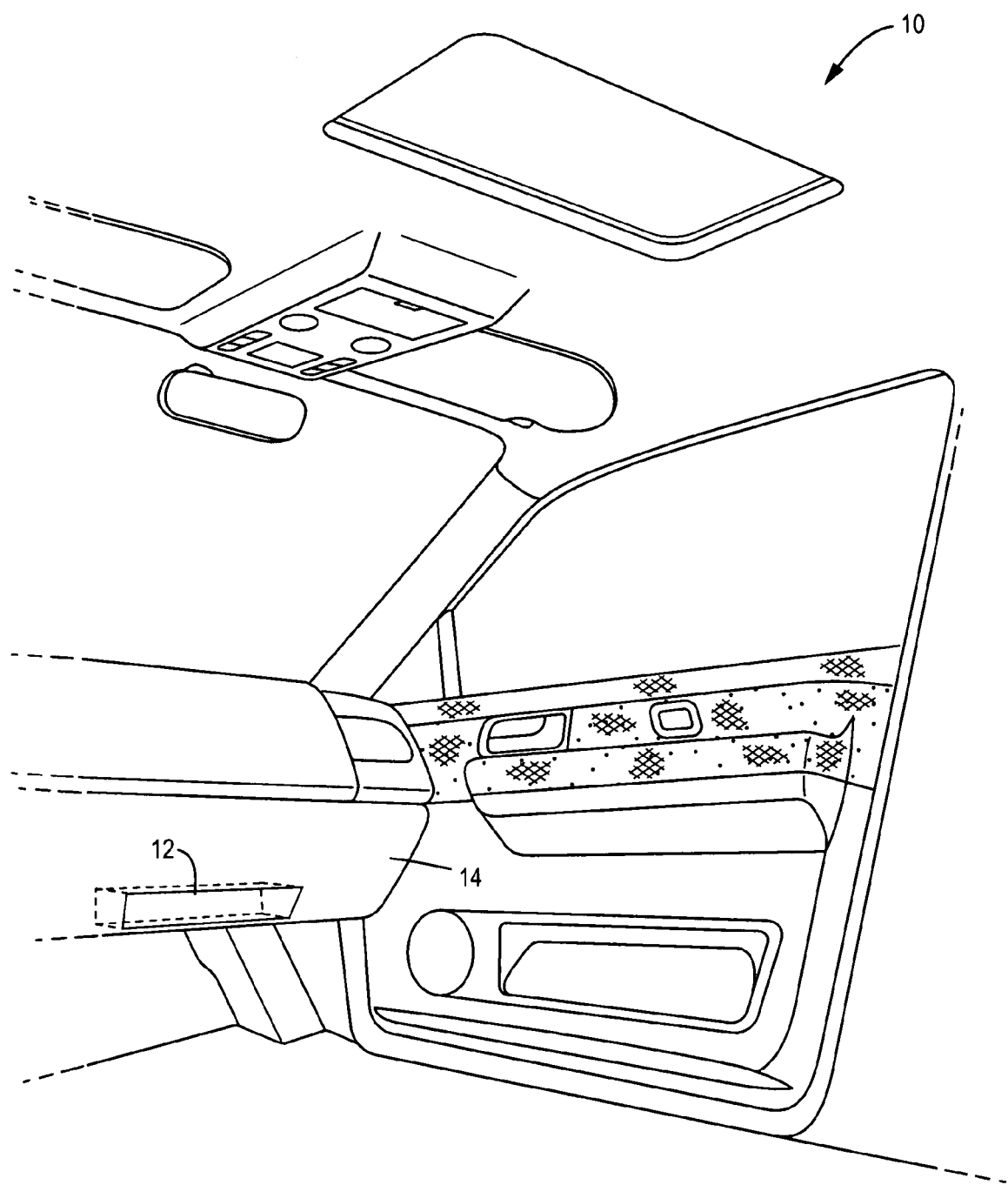
FIG. 1 is a perspective view of the interior of a vehicle illustrating a location of a knee airbag assembly according to an exemplary embodiment.

Referring to FIG. 1, the location of a knee airbag assembly 20 in the interior of a vehicle 10 is shown according to an exemplary embodiment. The airbag assembly 20 is stored and concealed in a housing 12 (e.g., recess, socket, compartment, etc.) in a dash panel 14. According to one exemplary embodiment, the dash panel 14 may be below an instrument panel (e.g., for a driver's side knee airbag assembly). Thus, the knee airbag assembly 20 may be a driver or passenger side airbag assembly.

Figure 2:
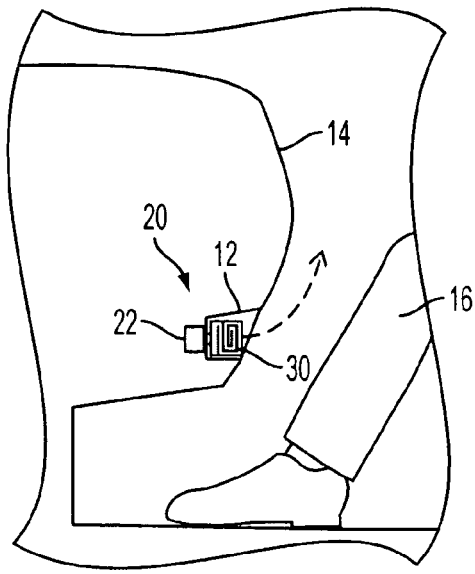
FIG. 2 is a side view of a vehicle interior showing a knee airbag in a stowed configuration and a trajectory of the knee airbag according to an exemplary embodiment.
Figure 3:
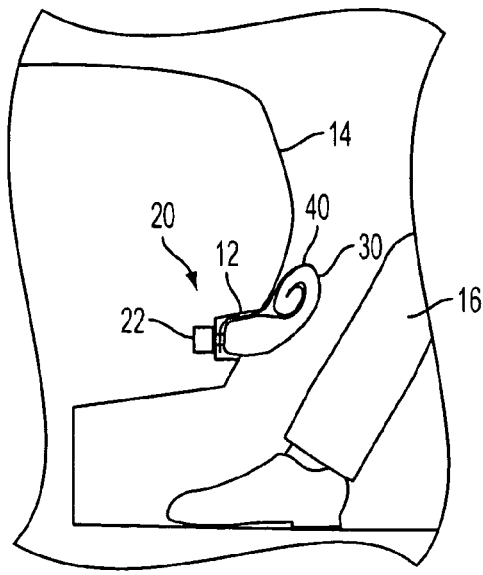
FIG. 3 is a side view of a vehicle interior showing a deploying knee airbag illustrating the external tether before the tether ruptures according to an exemplary embodiment.
Figure 4:
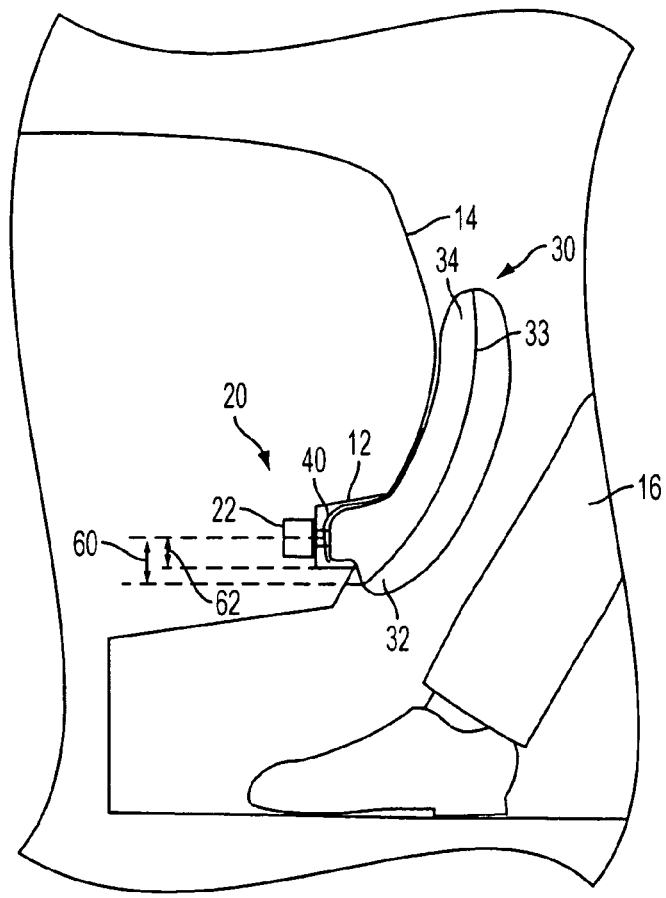
FIG. 4 is a side view of a vehicle interior showing a deployed knee airbag illustrating the relationship between chamber and the cushion/housing according to an exemplary embodiment.

Referring now to FIGS. 2-4, the knee airbag assembly 20 is shown according to an exemplary embodiment. The knee airbag assembly 20 includes an airbag cushion 30, that remains folded in the housing 12 awaiting deployment, and an inflator 22 to inflate the airbag cushion 30 once a collision is sensed. The inflator 22 is, for example, a conventional pyrotechnic gas generator, or any other suitable type of inflator. The inflator 22 is coupled to the airbag cushion 30 with a diffuser bracket 24. When a collision is detected, the inflator 22 generates a gas that fills the airbag cushion 30. As the airbag cushion 30 is filled, the cushion 30 expands to deploy out of the housing 12 and between the occupant 16 and the vehicle dash panel 14.

Figure 5:
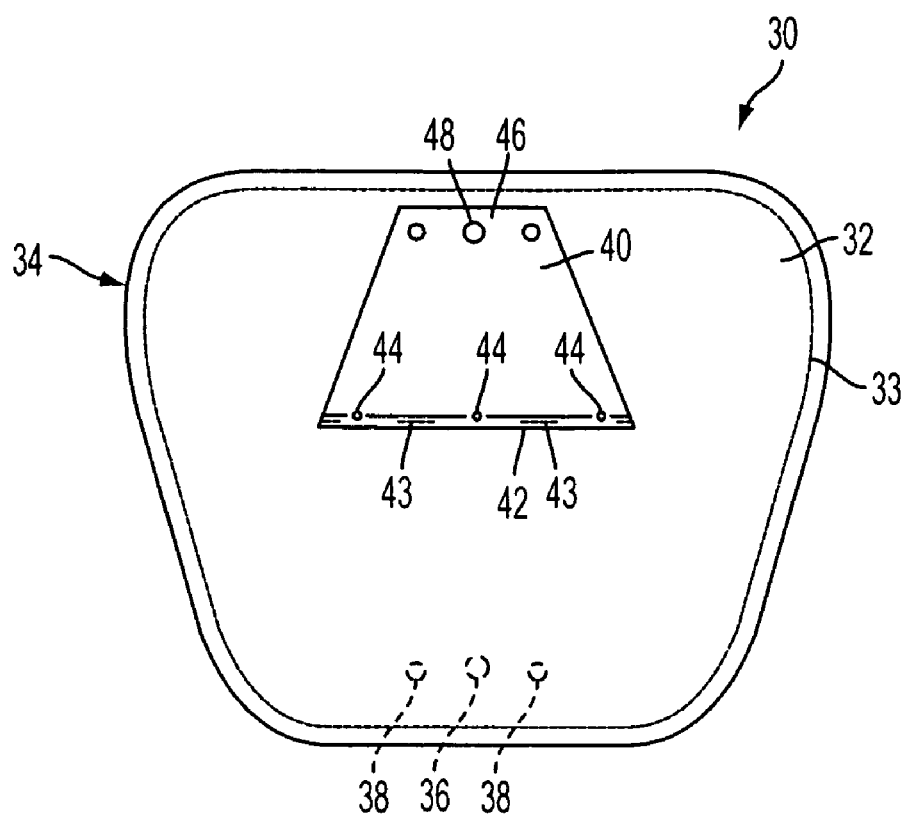
FIG. 5 is a front view of a flattened, uninflated knee airbag cushion illustrating a trapezoidal shaped external tether according to an exemplary embodiment.
Figure 6:
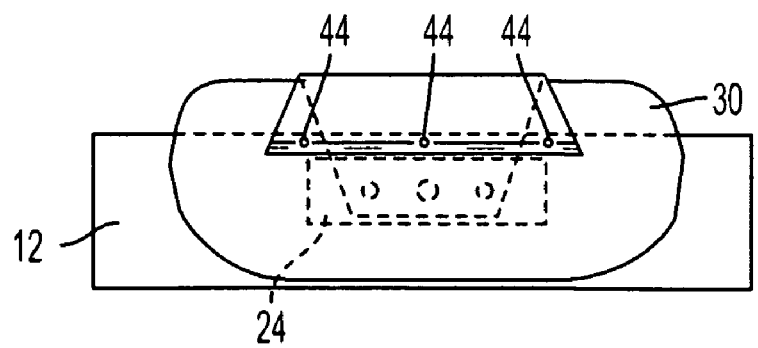
FIG. 6 is a front view of a flattened, uninflated knee airbag cushion illustrating the trapezoidal shaped external tether wrapped around the airbag cushion and coupled to a housing according to an exemplary embodiment.

Referring to FIGS. 5-6, a knee airbag cushion 30 is shown in more detail according to an exemplary embodiment. The cushion 30 is formed from several panels of a fabric such as nylon that are sewn together. Airbag cushions such as cushion 30 are generally formed with at least a front panel 32 and a rear panel 34 that are coupled together at a first seam 33 that extends generally around the periphery of the cushion 30. When the airbag cushion 30 is deployed, the rear panel 34 is proximate to the dash panel 14 with the front panel 32 remote from the dash panel 14, proximate to the occupant 16. An opening in the cushion 30 is aligned with the inflator 22. A portion of the inflator 22 extends through an opening 36 in the rear panel 34 so that gas generated by the inflator 22 can enter the cushion 30. The cushion 30 is trapped between the inflator 22 and the bracket 24. The bracket 24 extends through openings 38 in the rear panel 34 and is coupled to the inflator 22 to hold the cushion 30 in place.

The cushion 30 further includes an external tether 40 to help control the trajectory of airbag cushion 30 during deployment. More specifically, the tether 40 is configured to direct the airbag cushion 30 to deploy in a generally vertical direction, along the dash panel 14 rather than in a horizontal direction, towards the legs of the occupant 16. The tether 40 may be formed from the same material as the front panel 32 and the rear panel 34 such as a nylon fabric, or any other suitable type of material.

The external tether 40 is coupled to at least one of the front panel 32 or the rear panel. The tether 40 is releasably coupled to cushion 30 such that it may rip or tear away from the cushion 30 during the deployment of the cushion 30. This releasable coupling is provided along a relatively wide area so that the external tether 40 may more effectively compensate for lateral (e.g., left, right, center) variations in deployment speed of the cushion 30.

In an exemplary embodiment, the external tether 40 is a trapezoidal fabric panel with a wide end 42 and a narrow end 46. The narrow end 46 may have one or more openings 48 that are similar to the openings 36 and 38 in the rear panel 34. The openings 48 are aligned with the openings 36 and 38 in the rear panel 34 such that the narrow end 46 of the external tether 40 may be trapped between the inflator 22 and the bracket 24 along with the rear panel 34 to hold the external tether 40 in place (e.g., generally coupled to the inflator 22 and the bracket 24). The wide end 42 of the external tether 40 is coupled to the front panel 32. According to an exemplary embodiment, the wide end 42 is stitched to the front panel 32 at a second seam 43. The wide end 42 is first sewn to the cushion 30 and then the external tether 40 is wrapped around the cushion 30 so that the narrow end 46 may be coupled to the bracket 24, a fixed part of the knee cushion 30 near the housing, or the housing itself.

When wrapped around the cushion 30, the external tether 40 constrains the cushion 30 so that it may not fully inflate (see FIG. 3). The constraining of the cushion during deployment causes it to first deploy in a lateral direction (e.g., out to the side) and facilitates the deployment of the cushion 30 along a generally vertical trajectory. A multitude of frangible regions or break points 44 are provided proximate to the second seam 43 along which the external tether 40 may be torn or otherwise ruptured to allow the cushion 30 to fully deploy. While the external tether 40 is shown with three break points 44 in FIGS. 5 and 6, according to other exemplary embodiments, the external tether 50 may include more or fewer break points 44.

Figure 9A:
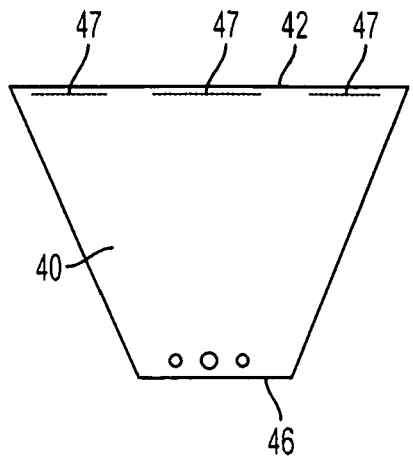
FIGS. 9A-9F are front views of an external tether for a knee airbag according to other exemplary embodiments.
Figure 9B:
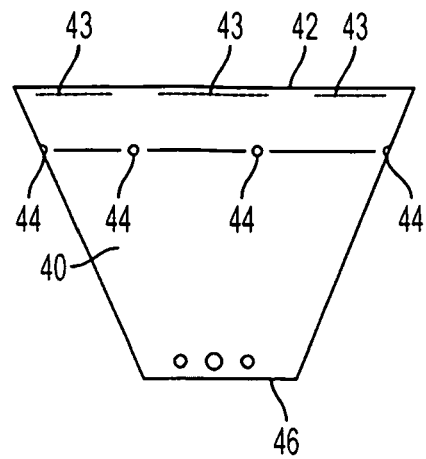
Figure 9C:
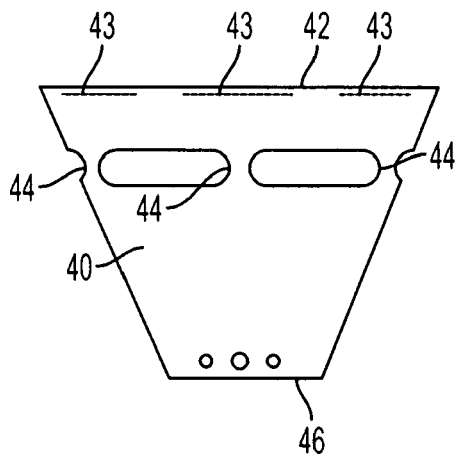
Figure 9D:
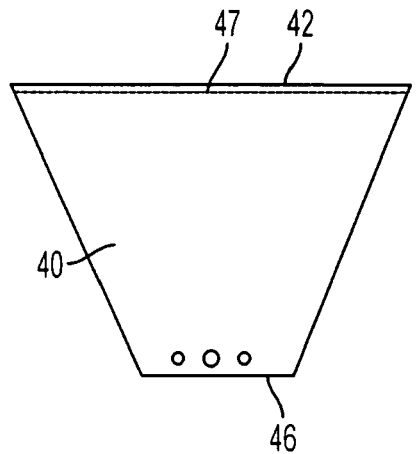
Figure 9E:
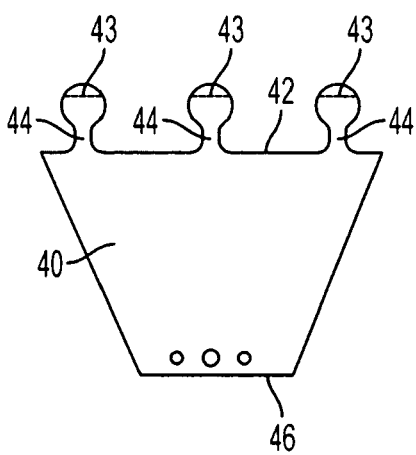

According to an exemplary embodiment, as shown in FIGS. 5, 6, and 9B, the break points 44 are provided in the form of narrow frangible portions. According to other exemplary embodiments, the break points 44 may be other structures (i.e., tear tabs, detachable stitches, etc.). By being located proximate to the wide end 42, the break points 44 are arranged over a wide range of areas. The gas generated by the inflator 22 may apply an uneven outward force on the cushion 30 causing an uneven deployment speed across the width of the cushion. The break points 44 can have a determined strength pre-set to control deployment trajectory of cushion 30 and balance the left-center-right speed of cushion 30.

Referring to FIGS. 9A-9F, external tethers 40 are shown according to several exemplary embodiments. For example, the break points 44 may be formed by narrow portions of the tether 40 formed by large openings (see FIG. 9C) or may be narrow portions of the tether 40 that connect the main body of the tether 40 to tabs that are coupled to the airbag cushion at seams 43.

According to other exemplary embodiments, the break points 44 may be provided in the form of frangible seams 47 (see FIGS. 9A, 9D, and 9F) that are configured to couple the tether 40 to the airbag cushion 30 and tear or burst during the deployment of the airbag cushion 30. The frangible seams 47 may be several discreet stitches provided along the wide end 42 of the tether 40 or may be a continuous stitch provided along the wide end 42 of the tether 40.

Figure 9F:
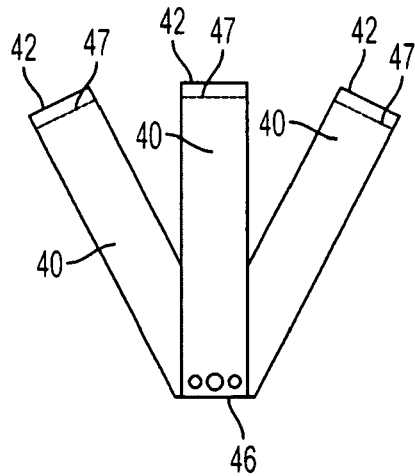

According to another exemplary embodiment, the external tether 40 may comprise one or more generally narrow strips that are coupled on a first end 46 to the bracket 24 and on a second end 42 to the airbag cushion 30 (see FIG. 9F). The second end 42 may be coupled to the airbag cushion at a fixed seam 43 and include break points 44 or may be coupled to the airbag cushion 30 with at frangible seam 47.

Referring now to FIGS. 7A and 7B, according to another exemplary embodiment, an airbag cushion 30 may include one or more internal tethers 50 to help control the trajectory of airbag cushion 30 during deployment. More specifically, the tethers 50 are configured to direct the airbag cushion 30 to deploy in a generally vertical direction, along the dash panel 14 rather than in a horizontal direction, towards the legs of the occupant 16. The tethers 50 may be formed from the same material as the front panel 32 and the rear panel 34 such as a nylon fabric.

Internal tethers 50 are shifted between front and rear panel to pull the cushion 30 upward against the dash panel 14 surface, improving deployment trajectory and reducing the interaction of the cushion with the occupant's legs. The distance between the point at which the internal tethers 50 are coupled to the rear panel 34 and the bracket 24 is less than the distance between the point at which the internal tethers 50 are coupled to the front panel 32 and the bracket 24 such that the tethers 50 form an acute angle (Θ) with the rear panel 34. The angle (Θ) is determined by the length of the internal tether 50 and the offset between the points at which the internal tether 50 is coupled to the rear panel 34 and the front panel 32. The difference in distance of each end of the tethers 50 to the bracket 24 urges the rear panel 34 to contract and be pulled upward. This pulling force helps to control the trajectory of the airbag cushion 30. According to an exemplary embodiment, at least one of the internal tethers 50 has an offset in a range of approximately 15 to 60 mm; or more specifically in a range of 20 to 50 mm, or more specifically of approximately 40 mm. For example, a distance from a bottom seam 33 to the first tether 50 in the first panel 32 is about 40 mm different from a distance from a bottom seam 33 to the first tether 50 on the rear panel 34. According to an exemplary embodiment, the angle (Θ) formed between the internal tethers 50 and the rear panel 34 is between five to 85 degrees, or in a range of 9 to 85 degrees, or more specifically in a range of 9 degrees to 81 degrees. According to a preferred embodiment, the angle (Θ) formed between the internal tethers 50 and the rear panel 34 is between 35 degrees and 80 degrees.

The internal tethers 50 and the geometry of the cushion 30 are configured to facilitate the generally vertical deployment of the knee airbag cushion 30 along the surface of the dash panel 14. An upward cushion 30 along the dash panel 14 rather than towards the occupant's legs provides decreased interaction between the airbag cushion 30 and the occupant's legs.

As shown in FIG. 4, the distance 60 from the center line of the bracket 24 to the seam 33 between the front panel 32 and the rear panel 34 is greater than the distance 62 between the center line of the bracket 24 and the lower edge 13 of the housing 12. The cushion 30 bears against the lower edge 13 of the housing 12, which adds support to the cushion 30 and helps to support it in a generally vertical orientation (e.g., along the surface of the dash panel 14).

As shown best in FIGS. 7A and 7B, the front panel 32 extends longer than the rear panel 34 during inflation. The difference in extended lengths urges the cushion 30 to curve convexly outward (e.g., toward the occupant 16) and more closely follow the contour of the dash panel 14. The offset internal tethers 50 allow the front panel 32 to extend farther upward such that the cushion 30 inflates upward and follows the dash panel 14 as opposed to extending more toward an occupant. The panels 32, 34 can have the same length prior to inflation or different lengths. However, the offset tethers 50 (in conjunction with the external tether 40) is what creates the inflation shape of the knee airbag cushion 30. FIG. 7C illustrates a conventional knee airbag that includes parallel internal tethers (no offset angle, or offset angle is equal to 90 degrees).

Figure 8:
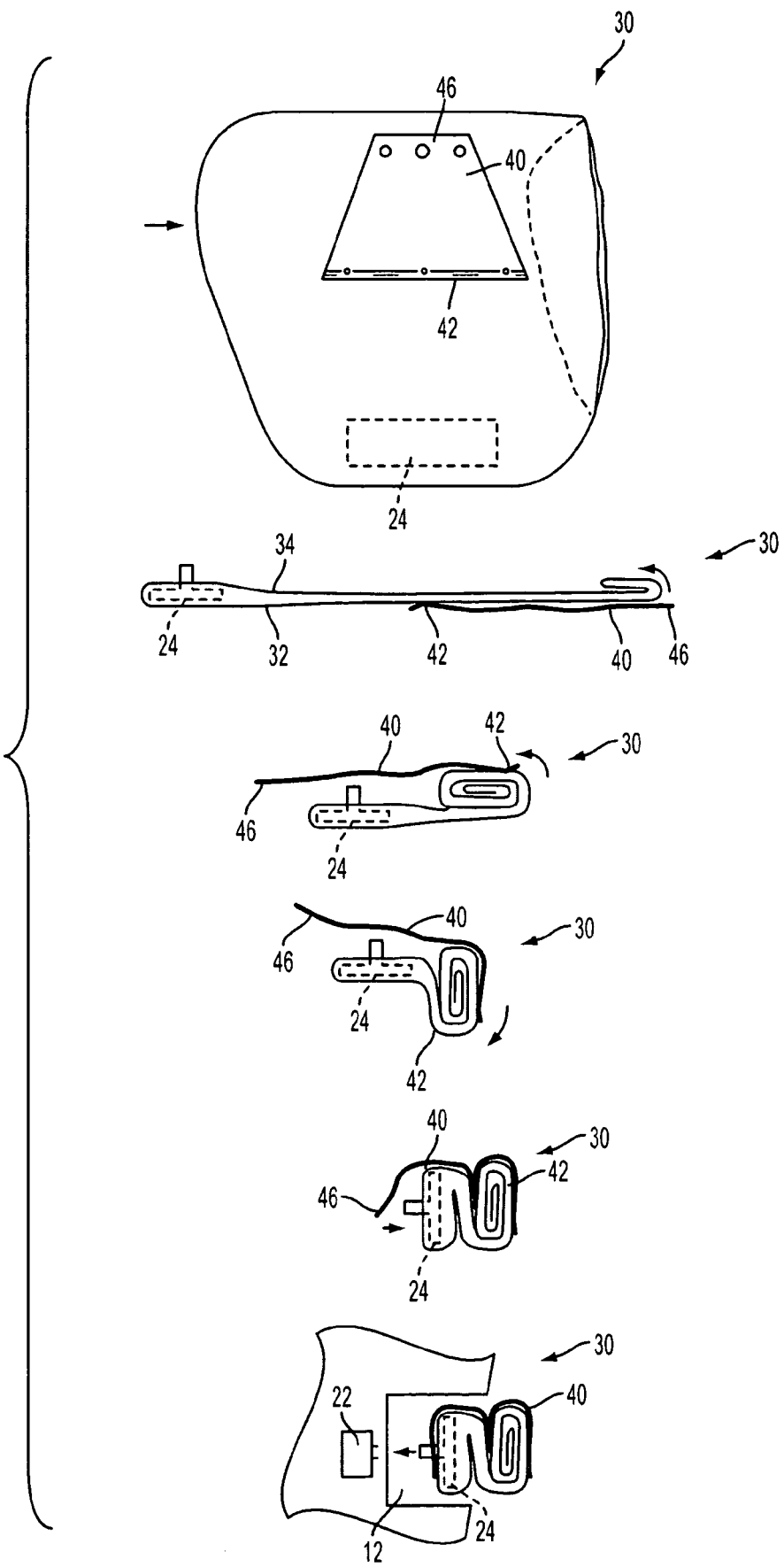
FIG. 8 is a side view of a process for the folding of a knee airbag according to an exemplary embodiment.

Referring now to FIG. 8, a method of folding the knee airbag cushion 30 is shown. The airbag cushion 30 is folded to better control trajectory and deployment of the cushion 30. The cushion is laid out flat in uninflated state with the rear panel 34 facing upward and the wide end 42 an external tether 40 coupled to the front panel 34. The sides of the knee cushion 30 may be tucked into the cushion to reduce the width of the cushion 30.

The end of the cushion 30 remote from the bracket 24 (e.g., the top of the cushion 30) are then folded back on itself a number of times. According to an exemplary embodiment, the cushion 30 is folded back five times. According to other exemplary embodiments, the cushion 30 may be folded back more or fewer times, for example, depending on the length of the cushion 30 and the desired size of the stowed cushion 30. The narrow end 46 of the external tether 40 is then coupled to the bracket 24. The final fold of the cushion 30 and the tether 40 is a half fold in the opposite direction (e.g., a half "Z" fold). Additional "Z" folds may be used. When the cushion 30 and the tether 40 are folded, they are held in the housing 12 proximate to the inflator 22, with the bracket 24 coupled to the inflator 22.

It should be recognized that the front and rear panels may be formed of one single sheet that is folded over and sewn together to from the knee cushion. Alternatively, the knee cushion 30 may be formed from any suitable number of sheets (panels).

It is important to note that the construction and arrangement of the attachment method of an airbag inflator to an airbag module housing as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the description. For example, elements shown as integrally formed may be constructed of multiple parts or elements, the position of the elements may be reversed or otherwise varied, and the nature or number of discrete elements or positions may be altered or varied. Other substitutions, modifications, changes and omissions may be made in the design, operating conditions and arrangement of the exemplary embodiments.

What is claimed is:

1. A knee airbag apparatus, comprising:
a front panel configured to face toward an occupant when the knee airbag deploys:
a rear panel configured to face toward an instrument panel when the knee airbag deploys, the rear panel joined to the front panel to form an inflatable knee cushion configured to inflate to protect an occupant's knees during a crash event, the front and rear panels being joined at a bottom perimeter seam;
a first internal tether extending between the front and rear panels, the first internal tether attached to the front panel at a front panel attachment location and attached to the rear panel at a rear panel attachment location; and
an external tether,
wherein a first end of the external tether is attached to the front panel, and a second end of the external tether is fixed to a housing member, and
wherein a distance between the rear panel attachment location and the bottom perimeter seam is less than a distance between the front panel attachment location and the bottom perimeter seam when the airbag is inflated.

2. The knee airbag apparatus of claim 1, further comprising a second internal tether extending between the front and rear panels, the second internal tether being attached to the front panel at a second front panel attachment location and attached to the rear panel at a second rear panel attachment location, wherein a distance between the second rear panel attachment location and the bottom perimeter seam is less than a distance between the second front panel attachment location and the bottom perimeter seam when the airbag is inflated.

3. The knee airbag apparatus of claim 2, wherein the second internal tether is parallel to the first internal tether.

4. The knee airbag apparatus of claim 2, wherein an offset angle between the front panel attachment location and the rear panel attachment location of the first internal tether is different from an offset angle between the second front panel attachment location and the second rear panel attachment location of the second internal tether.

5. The knee airbag apparatus of claim 1, wherein an offset angle between the front panel attachment location and the rear panel attachment location of the first internal tether is less than 90 degrees.

6. The knee airbag apparatus of claim 5, wherein the offset angle is in a range of five to 85 degrees.

7. The knee airbag apparatus of claim 2, wherein the first and second internal tethers are configured to pull the knee cushion upward against the instrument panel.

8. The knee airbag apparatus of claim 1, wherein the distance between the rear panel attachment location and the bottom perimeter seam is less than the distance between the front panel attachment location and the bottom perimeter seam by approximately 15 to 60 mm.

9. The knee airbag apparatus of claim 1, wherein the first internal tether has an offset between the front panel attachment location and the rear panel attachment location in a range of approximately 15 mm to 60 mm.

10. The knee airbag apparatus of claim 9, wherein the first internal tether has an offset angle between the front panel attachment location and the rear panel attachment location in a range of nine to 85 degrees.

11. The knee airbag apparatus of claim 1, wherein the external tether comprises a trapezoidal shape.

12. The knee airbag apparatus of claim 1, wherein the external tether includes at least one frangible portion.

13. The knee airbag apparatus of claim 1, wherein the first end of the external tether is releasably attached to the front panel.

14. The knee airbag apparatus of claim 1, wherein the first end or a middle portion of the external tether includes a frangible portion configured to release the external tether from the knee airbag.

15. The knee airbag apparatus of claim 1, further comprising a bracket configured to mount the knee airbag in a housing, the housing located in an instrument panel of a vehicle.

16. The knee airbag apparatus of claim 15, wherein a first distance from a center line of the bracket to a seam connecting the front and rear panels at a bottom of the knee cushion is greater than a second distance from the center line of the bracket to a lower edge of the housing.

17. The knee airbag apparatus of claim 1, wherein the front and rear panels are formed of a single sheet.

* * * * *